Figure 6:
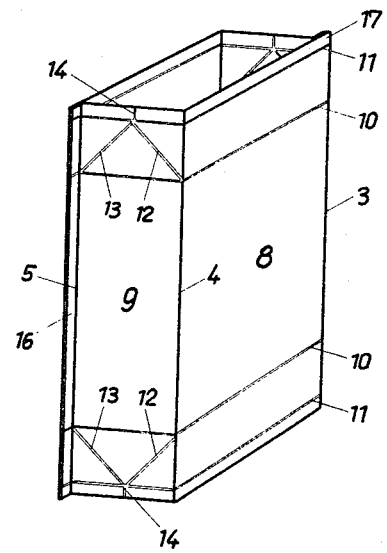
Figure 7:
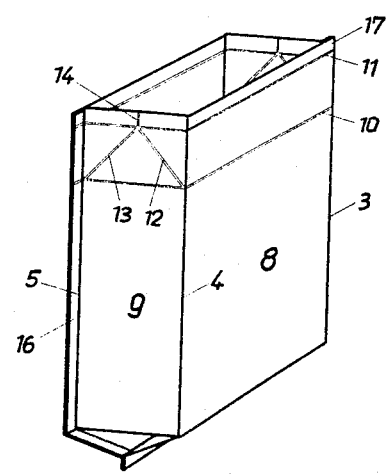
Figure 8:
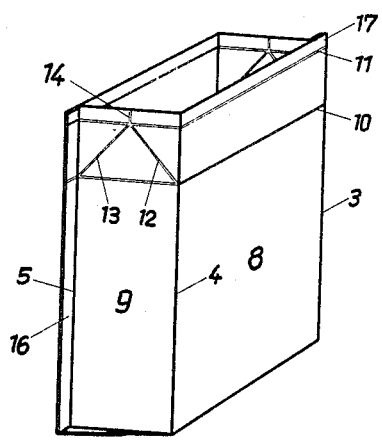
Figure 9:
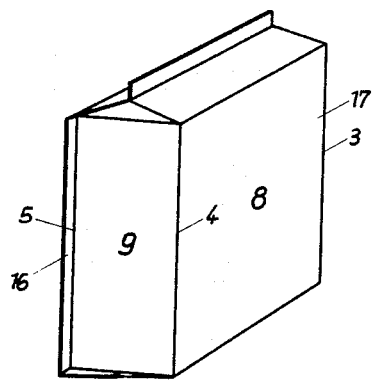

Oct. 25, 1966 G. MEYER-JAGENBERG 3,280,531
METHOD AND APPARATUS FOR THE MANUFACTURE, FILLING
AND CLOSING OF LIQUID-TIGHT CONTAINERS
Filed June 6, 1963 6 Sheets-Sheet 1
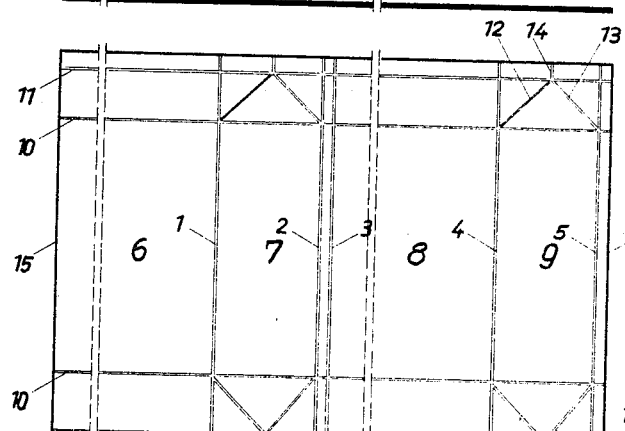
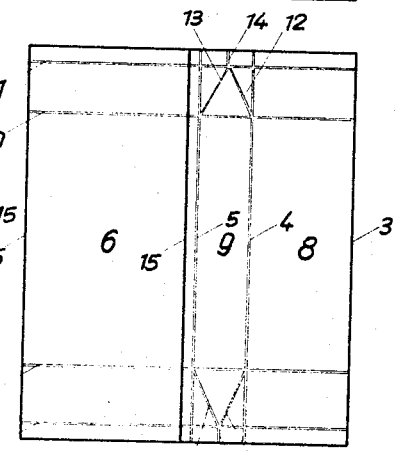
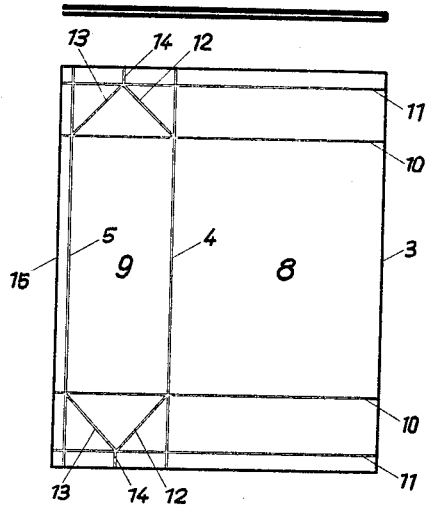
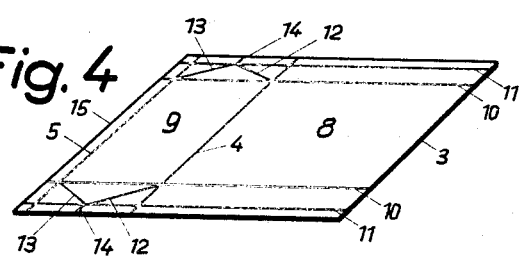
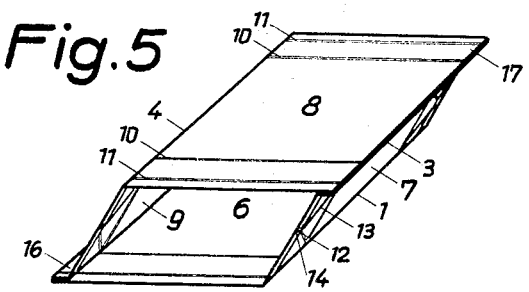

Oct. 25, 1966   G. MEYER-JAGENBERG   3,280,531
METHOD AND APPARATUS FOR THE MANUFACTURE, FILLING
AND CLOSING OF LIQUID-TIGHT CONTAINERS
Filed June 6, 1963   6 Sheets-Sheet 2

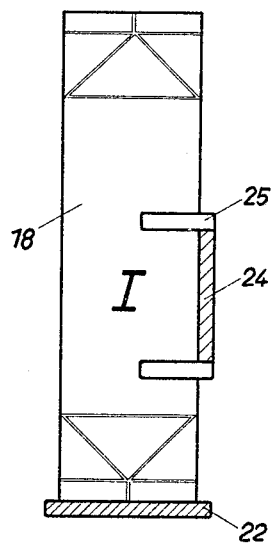

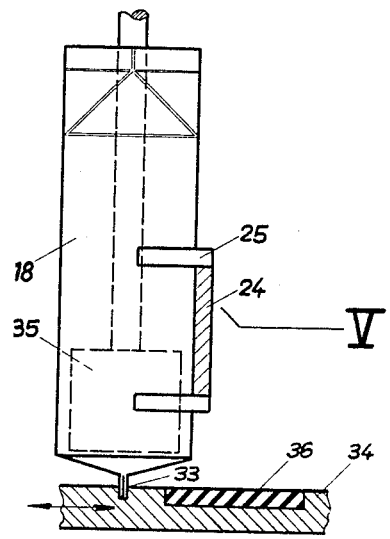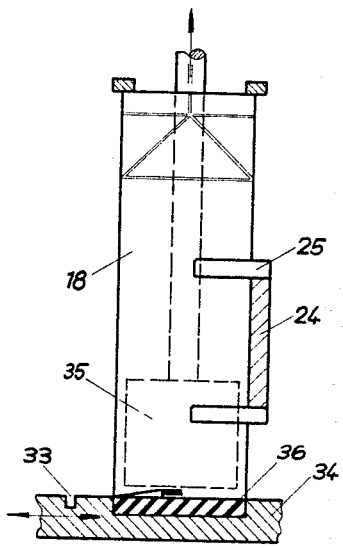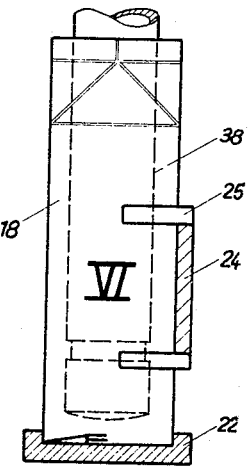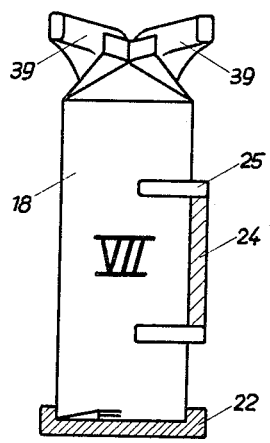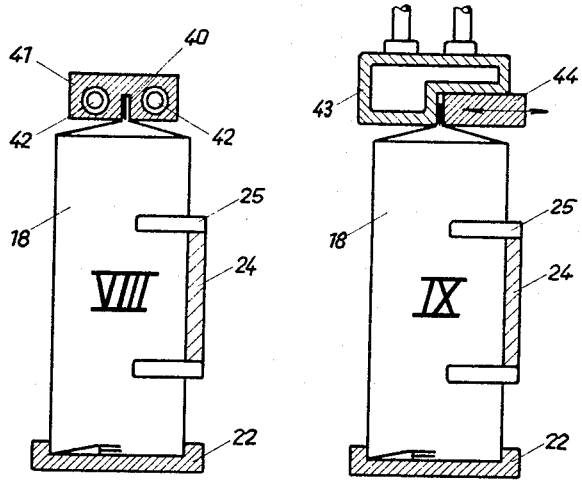

United States Patent Office 3,280,531
Patented Oct. 25, 1966

3,280,531
METHOD AND APPARATUS FOR THE MANUFACTURE, FILLING AND CLOSING OF LIQUID-TIGHT CONTAINERS
Gunther Meyer-Jagenberg, Dusseldorf-Grafenberg, Germany, assignor to Jagenberg Werke Akt.-Ges., Dusseldorf, Germany
Filed June 6, 1963, Ser. No. 286,006
Claims priority, application Germany, June 22, 1962,
J 21,981
4 Claims. (Cl. 53—29)

This invention relates to a method of and apparatus for manufacturing, filling and sealing liquid-tight containers.

For the storage of mass consumption or bulk commodities such as milk and the like, increasing use is being made of the so-called "single use container or carton." Naturally such containers must meet higher requirements with regard to economical and rational manufacture of the containers as well as tightness, rigidity and simple handling of the container. Particular attention must be given in connection with the situation to the technical problems as regards production and further processing which arise in the making of these containers which preferably are made of paper, cardboard or like carton-forming materials.

There are basically two systems or methods for the manufacturing and subsequent processing of single unit containers, and the characteristics of both systems or methods possess advantages as well as disadvantages. It is known in the art to manufacture such containers in paper processing plants which supply other processing plants such as, for example, dairies, with containers ready for the filling operation. An objection to this method or system resides in the necessity of storing and transporting containers in opened condition which, due to the shape of the containers, requires considerable space. However, a material advantage of this system is that the manufacture of the containers occurs in a paper processing plant, whereas further processing, namely, the filling and closing of the containers, takes place in the dairy. In this fashion the dairy operator does not have to perform operations which are foreign to the normal functioning of the dairy. This last-named situation is of special significance since the installation of a paper processing apparatus is for obvious reasons not recommended for use in a dairy, wherein considerable water is being employed for sanitation reasons.

The second system provides for performing all operations of manufacture, filling and sealing of the containers in the dairy. The advantage of this system is the elimination of the space consuming storage facilities and the shipping or transporting of the open containers. On the other hand, this system requires the installation and operation of a paper processing plant in the dairy which results in the disadvantages referred to in the preceding paragraph.

If the disadvantages of the above known systems are to be overcome and their advantages combined, it is essential to provide a type of container which is prefabricated in a paper processing plant but which can be stored and shipped in a space saving flat form and be delivered in such form at the dairy or other further processing plant which merely fills and closes the prefabricated containers.

Broadly, according to the present invention the method for the manufacturing, filling and sealing of liquid-tight, prismatic containers defined by a tubular container body and upper and lower gable-type folding closures comprises converting an initially flat rectangular blank provided with score lines into a flat tubular container body by means of folding and adhesion of the longitudinal seam, following storage and transportation, singling or separating the container bodies, opening the bodies, conveying the open containers along a predetermined conveyor path in an upright position whereby initially the lower end of the open body is formed into a gable-type closure by folding and sealing, filling the container, folding the upper end of the body to form a gable-type closure and sealing such upper closure.

The foregoing method provides conditions for a relatively small technical machine effort for the manufacture of a tubular container body which is fabricated on a folding box sealing machine by the folding and adhesion of the longitudinal seam, as well as in the further processing in the dairy by the use of simple equipment which merely fills the container and subsequently closes the filled container.

Bearing in mind the respective technical operating conditions, another important aspect of the method resides in the fact that the making of the container body by the folding and adhesion of the longitudinal seam of a rectangular blank is accomplished continuously with uninterrupted forward movement of the blank while the conversion of the container body into a container ready for filling as well as closing is accomplished by intermittent forward movement of the container. By virtue of this mode of operation, the tubular container body, after being separated and opened, moves intermittently along a straight conveyor path and during the course of movement along such path by means of stationary tools located above and below the conveyor path are converted into containers ready for the filling operation, filled and subsequently closed.

Following separation of the blanks, the gable-type bottom closure folds of the container which are open, are deformed to provide a flat bottom through folding and sealing whereby the prismatic container includes a stable supporting surface as the container is moved forward in an upright position.

The present apparatus comprises the placement in series according to the sequence of operations of means for singling or separating and opening the tubular container bodies, means for folding, sealing and flattening the lower gable-type closure, means for filling the container and means for folding and sealing the upper gable-type closure.

Another object of the present invention includes a conveyor means for moving the container bodies in a forward direction intermittently and stationary operating components below and above the conveyor means, respectively, for folding and sealing the lower gable-type closure, and following filling of the container from above fold and seal the upper gable-type closure.

A particularly efficacious embodiment of the apparatus which is capable of a large output includes a plurality of conveyor means preferably arranged adjacent each other in parallelism, having associated therewith means for separating, opening, forming the lower closure, filling and forming the upper closure with the control of movement of the respective means being effected by a common drive. The containers leaving or being discharged from the several conveyor means are then collected on a common discharge conveyor, gathered into groups and thereafter placed into receptacles.

Figure 10A:
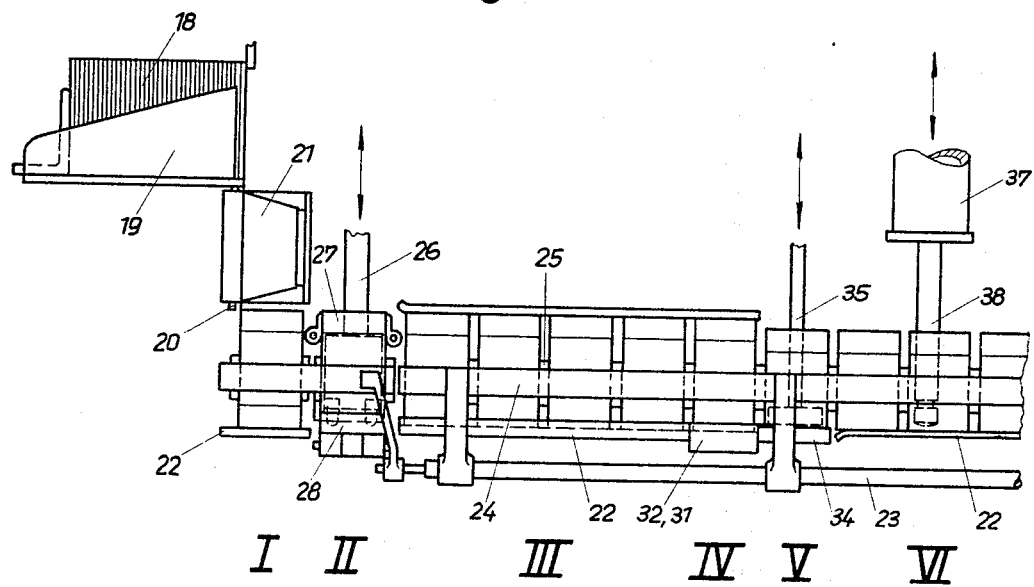
Figure 11A:
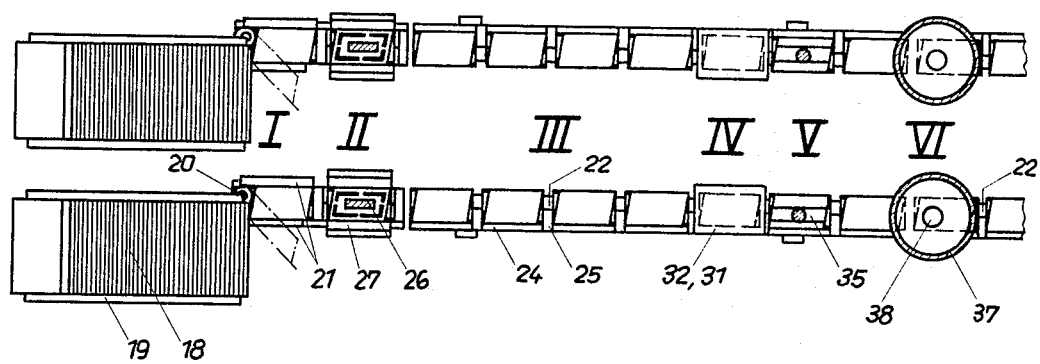
Figure 10:
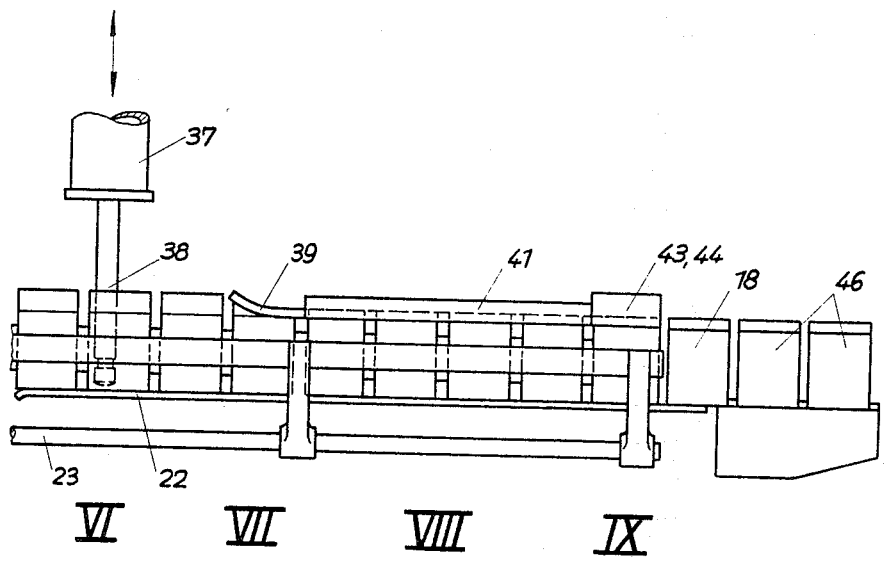
Figure 11:
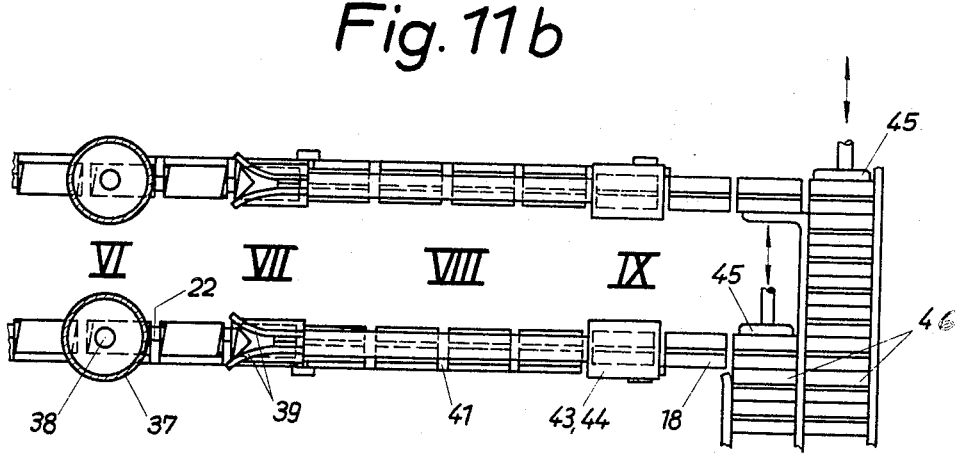

Further objects and advantages of the present invention will become more readily apparent to one skilled in the art from the ensuing detailed description and annexed drawings, in which:

FIGURES 1–9 respectively illustrate schematically the various steps for producing the container, starting from the flat blank of paper, cardboard or other carton-forming material, FIGURES 10a and 10b are diagrammatic views in side elevation, partly broken away, of an apparatus for filling and closing the container, FIGURES 11a and 11b are plan views of the apparatus shown in FIGURES 10a and 10b, and FIGURES 12-22 respectively illustrate diagrammatically the construction, arrangement and mode of operation of the tools which shape, fill and close the container.

The container is made from a rectangular flat blank B (FIGURE 1a), preferably of paper, cardboard or other material suitable for containers or cartons. It will be noted that the blank is provided with score lines 1, 10 and 1a which, together with side edge 15, provide one side wall 6 of the container. Score lines 3, 4 and 10 define the other side wall 8. Score lines 1 and 2 provide one end wall 7, while score lines 4 and 5 the other end wall 9.

The blank is coated, at least on the inside, with a synthetic plastic material possessing impregnating as well as adhesive properties under the influence of heat and pressure.

The end walls 7 and 9 are provided with score lines 12, 13 and 14 in proximity to the ends thereof for forming upper and lower gable-type folding closures.

As best shown in FIGURES 2 and 2a, the blank B is folded along the score line 3 to the position shown in FIGURES 3 and 3a for providing a 2-ply structure, with side edge 15' of the blank being in alignment with the side edge 15. The next step consists in sealing the edge along the score line 3 and the area of the overlapped cut edges 15, 15' under the influence of heat and pressure providing a flat tube-like body having web seams 16 and 17 (FIGURE 5).

The manipulative steps above described, namely, the shaping of the initially flat blank B into a flat tubular container body, occur during the continuous passage of the blank through a folding box adhesion machine which effets the raising, folding and securing of the longitudinal seam on the continuously forward moving blank in a manner essentially known.

Following the production of the container bodies along the lines described, and after shipping and intermediate storage of the prefabricated containers, the containers are further processed in the dairy so that the bodies are converted into containers ready for filling, filled and thereafter closed. In this procedure, due to the type of manipulative steps required, the time periods necessary for the several steps in the further processing apparatus are substantially greater than those required by the continuously operating paper processing equipment. From this fact it is economically feasible to employ at least two machines, which differ materially in capacity, in the dairy, since the output of the folding box adhesion machine can compensate for the supply needs of a multiple of filling and sealing machines.

FIGURES 10a, 10b, 11a and 11b illustrate diagrammatically the processing of the prefabricated containers in the dairy, while FIGURES 12-22 depict the modes of operation of the tools at the various work stations.

With reference to FIGURES 10a and 10b it will be noted that flat tubular container bodies 18 are fed from a supply source or stack S to a filling and sealing machine FS, and FIGURES 11a and 11b illustrate the use of two parallel runs each including a conveyor means C and manipulative tools T.

The leading or foremost body 18 (by means substantially known) is moved into a folding pocket assembly 21 which is swingable about axis 20, with the swinging of the assembly resulting in the body 18 being opened to its full cross section. The thus opened body 18 is ejected downwardly from the assembly 21 and placed in the operating zone of the conveyor means C which serves to move the container in a forward direction intermittently. The conveyor means C includes a stationary slide track or guideway 22 for supporting the bodies 18 and a lifting comb-like structure 24 positioned laterally of the track 22 and extending longitudinally thereof, and the comb-like structure 24 is swingable about shaft 23. The comb-like structure 24 is provided with teeth or projections 25 arranged at spaced-apart intervals, with the area between adjacent teeth 25 constituting a cell for receiving an individual container body 18. In other words, the containers will be maintained in the cells and moved forward in a step-wise manner in the rhythm of operation of the machine.

After the container body 18 has been deposited in the first cell at station I (FIGS. 10a, 11b, 11a, 11b and 12), the container body is moved forward into the area of station II (FIGS. 13, 14) by virtue of the forward movement of the comb-like structure 24. At station II, following the insertion of a shaping mandrel 26 which is movable upwardly and downwardly by suitable means, a preliminary breaking of the upper gable-type closure with the assistance of pivoted folding arms 27 together with the folding of the lower gable-shaped closure by pivoted folding jaws 28 occurs. After additional intermittent forward movement of the body 18, the lower gable-type closure moves to station III where its folding is completed by passage through a slot 29 provided in the track 22 and the thermoplastic coating on the inside of the body 18 is activated, that is, being made capable of adhesion, by means of heating elements 30 embedded in the track 22 on opposite sides of the slot 29.

As shown in FIGURES 10a, 10b, 11a, 11b and 16, the pressing together and sealing of the closure is accomplished at station IV. To accomplish this end there is provided a hollow stationary pressure jaw 32 with which cooperates a laterally movable pressure jaw 31, and setting of the previously heated thermoplastic material can be accelerated by introducing a cooling medium into the interior of the jaw 32.

With the continued forward movement of the container body 18, which is now closed and sealed at the bottom, through station V (FIGS. 17 and 18), the projecting seam of the bottom closure enters slot 33 of a slidable track component 34 which executes a short movement laterally relative to the direction of movement of the container body. By reason of this arrangement, the projecting seam of such closure is displaced flatly and in the meantime a press ram 35, which is movable upwardly and downwardly, has entered the interior of the container and further compresses the folded closure for forming a flat bottom. For achieving a uniform pressure, an elastic supporting insert 36 is provided in the track component 34, as clearly illustrated in FIGURE 18.

The container body 18 is now ready for the filling operation which is effected at station VI (FIGS. 10a, 10b and 19). The filling is accomplished by means of a filling unit 37 located above the conveyor means C, and the unit is provided with a filling nipple 38. The unit 37 and the nipple 38 are capable of upward and downward movement, with the nipple 38 entering the opened container and being moved in an upward direction with the rising level of the contents and ultimately being withdrawn from the container body 18.

The container 18, which is now filled, is by its forward movement moved with its upper closure into the area of station VII (FIG. 20) at which station stationary folding blades 29 fold the preformed upper closure components together. Adjacent to station VII is station VIII (FIG. 21), which station includes an upper rail 41 having therein an axial guide slot 40 with heating elements 42 being embedded in the rail on opposite sides of the slot 40. At this station the slot 40 completes the folding of the upper closure and the heating elements 42 activate the thermoplastic material on the inside of the body 18.

At the rear end of the rail 41 is station IX (FIG. 22) which includes a pressure unit defined by hollow stationary pressure jaw 43 and a movable pressure jaw 44. The jaws 43 and 44 function in the same manner as the jaws 31 and 32 previously described.

The filled and sealed containers 18 leaving the two conveyor means CS are then deposited onto a collecting conveyor 46 by means of pusher elements 45 which are movable transversely with respect to the conveyor means CS and are subsequently collected in groups in a known manner for insertion into storage receptacles.

The invention is not to be confined to any strict conformity to the showing in the drawings, but changes or modifications may be made therein so long as such changes or modifications mark no material departure from the spirit and scope of the appended claims.

What I claim is:

1. A method for manufacturing, filling and closing liquid-tight prismatic containers having a tubular body and upper and lower gable-shaped folded closures, comprising the steps of scoring a flat substantially rectangular blank along lines for defining generally rectangular side and end walls and upper and lower gable-shaped closures, folding the blank about the center score line for providing a flat two-ply body with the free edges in alignment, sealing the free edges together, opening the flat body for forming the side and end walls and open upper and lower closures, introducing shaping means into the thus opened body and simultaneously preliminarily breaking the upper gable-shaped folded closure and folding the lower gable-shaped folded closure, withdrawing the shaping means from the opened body, sealing the lower closure, filling the body, and folding and sealing the upper gable-shaped closure to form the liquid-tight container.

2. The method for manufacturing, filling and closing liquid-tight prismatic containers as claimed in claim 1 in which the container is provided with a flat bottom, comprising laterally displacing the projecting seam of the lower closure and applying pressure to the closure for forming the flat bottom.

3. An apparatus for filling and closing a liquid-tight prismatic container defined by a rectangular blank shaped to form a flat two-ply body having rectangular side and end walls, upper and lower gable-shaped folded closures with the free edges in alignment and sealed to provide a longitudinal seam, comprising means operative for opening the flat body to form the side and end walls and open upper and lower closures, a shaping mandrel movable into and out of the opened body, folding tools swingable about fixed points for coaction with the upper closure for effecting preliminary breaking of the upper closure, further folding tools swingable about fixed points for coaction with the lower closure for folding the lower closure, said folding and further folding tools being operable simultaneously upon movement of the shaping mandrel into the opened body, means for sealing the thus folded lower closure, means for filling the body after movement of the shaping mandrel out of the body, and tool means for folding and sealing the upper gable-shaped closure.

4. The apparatus as claimed in claim 3 in which the container is provided with a flat bottom, comprising a slidable track component having a slot therein adapted to receive the projecting seam of the lower closure, and means for effecting lateral movement between the track component and body whereby the projecting seam is laid flat relative to the bottom of the container.

References Cited by the Examiner

UNITED STATES PATENTS

| | | | |
|---|---|---|---|
| 2,125,147 | 7/1938 | Bergstein | 93—49 |
| 3,055,152 | 9/1962 | Williams | 53—29 |
| 3,060,654 | 10/1962 | Lubersky et al. | 53—29 |
| 3,120,089 | 2/1964 | Monroe et al. | 53—186 |
| 3,153,374 | 10/1964 | Borkmann et al. | 93—44.1 |

FRANK E. BAILEY, *Primary Examiner.*

S. ABEND, *Assistant Examiner.*